US007980200B2

(12) United States Patent
Troutman (10) Patent No.: US 7,980,200 B2
(45) Date of Patent: Jul. 19, 2011

(54) ECTOPARASITE DIAGNOSTIC APPARATUS AND METHOD OF USE THEREOF (76) Inventor: C. Michael Troutman, Honeoye Falls, NY (US)

( * ) Notice: Subject to any disclaimer, the term of this patent is extended or adjusted under 35 U.S.C. 154(b) by 247 days.

(21) Appl. No.: 12/485,254

(22) Filed: Jun. 16, 2009

(65) Prior Publication Data
US 2009/0313881 A1 Dec. 24, 2009

Related U.S. Application Data (60) Provisional application No. 61/073,892, filed on Jun. 19, 2008.

(51) Int. Cl.
A01K 29/00 (2006.01)
A01M 5/00 (2006.01)
(52) U.S. Cl. ............ 119/651; 119/6.5; 119/662; 43/139
(58) Field of Classification Search ................. 119/626, 119/618, 6.5, 651; 47/107, 139
See application file for complete search history.

(56) References Cited

U.S. PATENT DOCUMENTS

| 4,089,592 | A | 5/1978 | Cudmore |
| 4,485,583 | A | 12/1984 | Planty |
| 4,630,329 | A | 12/1986 | Shores |
| 4,729,147 | A | 3/1988 | Armbruster |
| 4,799,460 | A | 1/1989 | Kuhl |
| 5,074,006 | A | 12/1991 | Eremita |
| 5,115,765 | A | 5/1992 | El Omary |
| 5,211,131 | A | 5/1993 | Plyler |
| 5,685,261 | A | * | 11/1997 | Krietzman | 119/626 |
| 5,768,748 | A | * | 6/1998 | Silvera et al. | 15/402 |
| 5,870,851 | A | 2/1999 | Shoemaker |
| 6,130,253 | A | 10/2000 | Franklin et al. |
| 6,345,592 | B1 | 2/2002 | Hollis |
| 6,817,139 | B1 | 11/2004 | Powell et al. |
| 7,110,586 | B2 | 9/2006 | Bacus et al. |
| 7,159,274 | B2 | 1/2007 | Freidell |
| 7,237,504 | B2 | 7/2007 | Davis et al. |
| 7,496,228 | B2 | * | 2/2009 | Landwehr et al. | 382/170 |
| 2005/0025357 | A1 | 2/2005 | Landwehr et al. |
| 2007/0169403 | A1 | * | 7/2007 | Collins | 43/139 |

FOREIGN PATENT DOCUMENTS

| JP | 7067492 A | 3/1995 |
| JP | 8182439 | 7/1996 |
| JP | 2005270615 A | 10/2005 |

* cited by examiner

Primary Examiner — Kimberly S Smith
Assistant Examiner — Joshua Huson
(74) Attorney, Agent, or Firm — Williamson Intellectual Property Law, LLC; Thomas R. Williamson, III (57) ABSTRACT An ectoparasite diagnostic apparatus comprising a vacuum motor, a microscope, a display, a non-flexible pivoting door and a containment chamber, wherein the microscope is in electrical communication with the display. The ectoparasite diagnostic apparatus provides a method of capturing live ectoparasites for observation removing live ectoparasites from a subject animal, disposing the live ectoparasites in the containment chamber, opening the non-flexible pivoting door and inserting a flea control compound, closing the non-flexible pivoting door and observing the effects of the flea control compound on the live ectoparasites via the microscope and the display.

4 Claims, 4 Drawing Sheets

ECTOPARASITE DIAGNOSTIC APPARATUS AND METHOD OF USE THEREOF

CROSS-REFERENCE TO RELATED APPLICATIONS

This non-provisional application claims priority to, and the full benefit of, U.S. Provisional Application No. 61/073,892, filed Jun. 19, 2008, entitled "Portable Electric Vacuum to Trap Fleas for Resistance Testing".

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The preferred embodiment relates generally to an ectoparasite diagnostic apparatus and method of use thereof, and more specifically to an ectoparasite diagnostic apparatus comprising a vacuum motor, a microscope, a display, a non-flexible pivoting door and a containment chamber, wherein live ectoparasites are captured within the containment chamber and utilized for testing the live ectoparasites susceptibility to different flea chemical compounds.

2. Description of Related Art

Throughout human history, pets have provided their owners with enormous amounts of companionship, loyalty, and entertainment, making it obvious why, to this day, pet animals remain popular. Most pet owners consider their pet animal as a part of the family. As such, most pet owners treat their pet with the same affection and protective care as they would with family members. It is this bond that makes most pet owners take meticulous care of their pets, often with the guidance of a veterinarian, to keep their pet healthy and maintaining a high quality of life. Achieving this goal with pets including dogs, cats, birds and mice, results in an everlasting battle with the common enemy of warm-blooded vertebrates: The ectoparasite, of which the main species is more commonly known as the flea.

Fleas are insects adapted with mouthparts able to pierce skin and suck blood from mammals and birds. That is, they are external parasites living by hematophagy (feeding on the blood of a host animal). There are numerous flea species; most often identified by the species of their primary host, such as, cat fleas (*Ctenocephalides felis*) whose preferred host is the domestic cat. However, in spite of their given name, flea species will feed off a wide spectrum of hosts. Thus, many flea species are possible threats to a variety of pets at any given time. It is with this constant threat in mind that pet owners must pay particular attention to their pets to prevent any possible flea infestation and/or to rid their pet quickly of an existing flea infestation.

With the advances of science and technology, chemical treatments are now the preferred method for eradicating fleas. Several commercial products are available for killing fleas on dogs and cats. Most of these products are chemicals that pet owners apply to the pet's skin. The products kill fleas and prevent a re-infestation for about 30 days. The chemicals used include imidacloprid, fipronil, selamectin, permethrin, and metaflumizone. Most of these chemicals have been widely utilized in the United Sates, Europe, and Asia. When utilized according to the manufacturer's recommendations, these products have been very effective at killing fleas. In fact, in the United States, pet owners spend over $1 billion annually for flea and tick control products. Nonetheless, reports are increasing about fleas developing resistance to the chemical effects of these compounds. For example, annual surveys of small-animal veterinarians have shown the percentage of United States veterinarians who have seen flea resistance to the chemicals nearly doubling in the past few years.

Veterinarians are in a unique position since pet owners with flea problems are most likely to seek professional advice and solutions from their veterinarian. Therefore, a veterinarian reporting increased resistance is a clear sign that popular professional products are becoming less effective. Currently, manufacturers of flea control products routinely test flea susceptibility to their chemicals in highly controlled laboratory tests with a single species of flea, *Ctenocephalides felis*. However, there are over 2,000 known species of fleas, and chemical manufacturers cannot adequately monitor resistance among that many species. Accordingly, veterinarians do not have a device for testing flea susceptibility to the products they provide their pet owner clients. Instead, they dispense professional products to pet owners that have been effective in the past. Unless pet owners call to complain that a recommended product does not kill fleas, veterinarians have no way of determining flea resistance to the product.

This raises the need for a convenient device that veterinarians can utilize in their clinics to test the effectiveness of different products before dispensing them to pet owners. Such a device needs to be able to capture fleas for each patient the veterinarian observes because there are so many different species. Susceptibility to different products may vary across the 2,000 species of fleas, so each of the fleas infecting each patient should be tested as a unique case.

Flea combs, consisting of closely spaced metal or plastic tines, have long been utilized to comb pets and thereby dislodge fleas. However, flea combs are susceptible to clogging from pet hair. Once fleas are dislodged, they are not easily captured for testing. Several patented devices have attempted to overcome this flaw through teaching mechanical removal of fleas from dogs and cats, which rely on first capturing the pest, but then almost immediately killing them through drowning, suffocating, poisoning or electrocuting means (since fleas are highly resistant to physical harm). These devices leave an operator with no opportunity to observe a live flea's reaction to commercial flea control products, and therefore such devices and methods are not particularly suitable as research tools.

Another device teaches a pet grooming device with a detachable head. The head piece is designed as a typical comb, with a pattern of bristles and openings designed to brush hair through a stroking motion. The headpiece is attached to a handheld vacuum apparatus, wherein a stream of air generated by the vacuum motor can be utilized to pull fleas from an animal's hair during the brush stroke of the grooming process. As fleas get caught in the air stream, they forcibly enter into a windowed vacuum bag housed within a transparent second chamber. Windowed sections of the vacuum bag allow a user to observe the inner contents of the bag. Once the grooming process is complete, the disposable vacuum bag containing any captured fleas can be removed from the device and sealed off by a drawstring before being discarded. Other than observing that the fleas have been captured, there is no means of analysis of flea behavior.

The windowed sections in the aforementioned device are supposed to provide a view of any of the captured contents within the vacuum bag. However, since fleas are small (typically between 1.5 to 3.3 mm long) they will be hard to find, either live or dead, within the bag, looking through just the windowed section alone. Further, observing live fleas in this device has the added difficulty of dealing with their extreme agility. Moreover, it will be difficult to discern between a flea and a spec of detritus captured by the vacuuming action. Also, this device does not allow a user to conveniently place chemical products within the bag to see their affect on the captured fleas, and instead a user may only observe fleas dying through suffocating means.

Additionally, there are numerous other grooming devices for pets that capture fleas from an animal during the grooming process that utilize a vacuum generated stream of air to provide the sucking force necessary to separate the flea from the animal's hair. However, once caught in the air stream the fleas are killed in a variety of ways. For example, one device teaches a staggered maze of fly-paper covered walls that are placed directly within the path of the air stream to catch fleas as they flow past. Another device places an electric grid within the path of the air stream to electrocute fleas as they flow past. Still another device utilizes a chamber filled with a mixture of water and chemicals, placed at the end destination of the air stream, so that fleas will be forcibly blown into the liquid where they will eventually be poisoned and/or drowned. Lastly, there are devices that direct fleas caught in the air stream into an enclosed containment chamber, wherein they are killed through various methods of chemical poisoning. While all of these devices have the express intent of mechanically removing fleas with a vacuum device and killing them by various exposures, none of them are provides for testing and observing live flea resistance to different chemicals utilized in commercial products.

Therefore, it is readily apparent that there is a need for a portable and easy to use apparatus that can mechanically collect live ectoparasites so they may be researched and observed while being exposed to various chemical products.

BRIEF SUMMARY OF THE INVENTION

Briefly described, the preferred embodiment overcomes the above-mentioned disadvantages and meets the recognized need for such an apparatus by providing an ectoparasite diagnostic apparatus comprising a vacuum motor, a microscope, a display connected to the microscope that is observable from outside the apparatus, a non-flexible pivoting door and a containment chamber. The apparatus is utilized by removing live ectoparasites from a subject animal, disposing the live ectoparasites in the containment chamber, treating the live ectoparasites with a flea control compound and observing the effect of the flea control compound on the live ectoparasite via the display.

The preferred embodiment is unique in that it can be utilized outside of a research laboratory setting to test the resistance of any species of fleas extracted from, for exemplary purposes only, a dog or a cat. The apparatus may utilize a standard flea comb to dislodge fleas and make them visible in a pet's hair coat. When fleas are dislodged, the vacuum motor draws the live fleas into the containment chamber.

In one embodiment, the apparatus consists of, for exemplary purposes only, a hand-held, 12-volt battery-powered vacuum suction assembly, with two attachments. One attachment is a tapered, tubular housing section with an elongated orifice that intensifies the vacuum suction. The other attachment is a transparent containment chamber where live fleas are deposited. The containment chamber comprises a non-flexible pivoting door that seals fleas in the containment chamber. The containment chamber is easily detachable from the vacuum assembly and tubular attachment. When a sufficient number of fleas have been captured for testing, the operator can quickly attach another containment chamber to capture another sample of fleas. This allows the operator to capture multiple flea samples from a pet for testing with different chemicals.

Additionally, many dogs and cats are easily disturbed by loud noises such as a vacuum motor, which makes it difficult to utilize vacuum assemblies near pets. In one embodiment, loud noises are minimized by utilizing a trigger for short bursts of suction power. The operator only activates the vacuum motor when they see live fleas during the combing process. Thus, the apparatus will most likely be utilized in a veterinary clinic where an assistant can work with the operator to ensure that the pet remains calm during the combing.

In another embodiment, a method for testing different chemicals is accomplished by introducing fibrous pads that have been treated with one of the common chemicals in commercial flea control products. The fibrous pads are treated with an amount of insecticide that resembles the amount of exposure fleas will get from, for exemplary purposes only, a dog or cat treated with the same insecticide. The small pads can be introduced into the containment chamber by opening the non-flexible pivoting door and inserting the pad into the containment chamber. Since the containment chamber is transparent, the operator and/or pet owners can easily observe the effects of exposure on the captured fleas. By testing different insecticides, the veterinarian and pet owner can pick the most effective product for quickly killing fleas, and avoid utilizing any products that have less efficiency.

According to its major aspects and broadly stated, the preferred embodiment is an apparatus for observing live ectoparasites comprising a containment chamber and an electronic imaging member. The electronic imaging member comprises a magnifying device and the magnifying device comprises a microscope having a digital display. The containment chamber is dimensioned to dispose live ectoparasites in the field of the microscope and further comprises a non-flexible pivoting door and a wire screen. The non-flexible pivoting door is controlled by an external knob and provides entrance and exit of the live ectoparasites into the containment chamber. The wire screen permits travel of moving air with the live ectoparasites therethrough, while also retaining the live ectoparasites within the containment chamber. The containment chamber further comprises a receiving aperture. The receiving aperture receives either a flea comb or a tubular housing with a nozzle.

In an alternate embodiment, the apparatus for observing live ectoparasites further comprises a hand-held vacuum assembly. The hand-held vacuum assembly comprises a vacuum motor in a housing with a manipulatable switch, and an opening that permits attachment of the containment chamber. The vacuum assembly removes the live ectoparasites from a subject animal and deposits the live ectoparasites within the containment chamber. A wire screen is disposed at an end of the containment chamber that is attached to the vacuum assembly. The wire screen prevents fleas from being sucked into the vacuum motor. The vacuum assembly further comprises a non-flexible pivot door at the other end of the containment chamber. The non-flexible pivot door is opened during vacuuming and closed after fleas are captured, so that live ectoparasties can be retained safely within the confines of the containment chamber in a live state. The live ectoparasites may subsequently be exposed to a fibrous pad treated with a popular veterinary flea control chemical to determine resistance of the live ectoparasites to the popular veterinary flea control chemical.

Additionally, the preferred embodiment is a method of capturing live ectoparasites for observation comprising the steps of obtaining an apparatus having a digital microscope with display and a containment chamber comprising a non-flexible pivoting door, removing live ectoparasites from a subject animal, disposing the live ectoparasites in the containment chamber, closing the non-flexible pivoting door and observing the live ectoparasites in the containment chamber via the digital microscope with display.

The method further comprises the steps of optionally vacuuming the live ectoparasites from the subject animal into the containment chamber, or optionally utilizing a flea comb to remove the live ectoparasites from the subject animal and disposing the flea comb in a receiving aperture in the containment chamber, such that the flea comb is disposed within the field of observation of the digital microscope, treating the live ectoparasites with a flea control compound and observing the effect of the flea control compound on the live ectoparasites.

Lastly, the preferred embodiment comprises a live flea observation apparatus having a containment chamber, a digital microscope with display and a vacuum assemble, such that the display is observable without the live flea observation apparatus. The live flea observation apparatus further comprises a non-flexible pivoting closure door and an aperture for receiving a flea comb.

More specifically, the preferred embodiment is a ectoparasite diagnostic apparatus comprising housing, a vacuum switch and a containment chamber. The housing comprises a handle, a back foot, a front foot, a secondary handle and a power cord, wherein the handle comprises an end. The housing further comprises a microscope, a mesh screen, a vacuum motor and a display, wherein the microscope is in electrical communication with the display. The end of the handle comprises the microscope, which is positioned to view fleas within the containment chamber. Additionally, the handle allows a user to grip the ectoparasite diagnostic apparatus as a hand-held apparatus, and the power cord supplies power to the ectoparasite diagnostic apparatus. When the ectoparsite diagnostic apparatus is not utilized, the power cord is wrapped around the secondary handle, and the ectoparsite diagnostic apparatus is supported on a surface via the front and back feet.

In the preferred embodiment, the containment chamber comprises a top, a bottom, a non-flexible pivoting door and a knob. The non-flexible pivoting door is disposed on top of the containment chamber. The mesh screen is disposed on the bottom of the containment chamber. The non-flexible pivoting door pivots open and close via the knob. The containment chamber also comprises a receiving aperture, which is dimensioned to receive a flea comb. The flea comb combs a subject animal to dislodge fleas and is then inserted into the receiving aperture. Fleas are then suctioned into the containment chamber by pushing the vacuum switch, thereby activating the vacuum motor. Once the vacuum motor is activated, fleas are pulled into the containment chamber against the mesh screen, while still allowing air and other debris to filter past the mesh screen. The non-flexible pivoting door is closed and the live fleas are confined in the containment chamber.

In another preferred embodiment, the containment chamber comprises a top, a bottom, a non-flexible pivoting door and a knob. The non-flexible pivoting door is disposed on top of the containment chamber. The mesh screen is disposed on the bottom of the containment chamber. The non-flexible pivoting door pivots open and close via the knob. The vacuum motor is activated via a vacuum switch. Once activated, the vacuum motor pulls fleas into the containment chamber against the mesh screen. The non-flexible pivoting door may be closed, such that the live fleas are confined in the containment chamber. The containment chamber further comprises a receiving aperture to receive a tube having a nozzle. The nozzle contacts a subject animal for fleas and the fleas are then suctioned into the containment chamber by the vacuum motor, thereby pulling the fleas into the containment chamber against the mesh screen. It will be recognized by those skilled in the art that the containment chamber and the non-flexible pivoting door may comprise a translucent material, such as rigid plastic or glass, thereby allowing an operator to visually determine if fleas have been suctioned into the containment chamber, and if the non-flexible pivoting door should be closed to confine fleas within the containment chamber.

In an alternate embodiment, the ectoparasite diagnostic apparatus comprises a vacuum assembly, a containment chamber and a nozzle. The vacuum assembly is secured to the containment chamber, and the containment chamber is secured to the nozzle. The vacuum assembly comprises a vacuum motor, a rechargeable battery door, a gripping handle and a trigger. The vacuum motor is activated by the trigger, which activates electric power to the vacuum motor, thereby creating suction at the nozzle. When the trigger is released, it returns the vacuum motor to an off position. The containment chamber comprises a top, a bottom, a non-flexible pivoting door and a knob. The non-flexible pivoting door is on top of the containment chamber, and the mesh screen is on the bottom of the containment chamber.

The alternate embodiment is utilized by a user gripping the handle of the ectoparasite diagnostic apparatus. The user's index finger is then positioned on the trigger. The other hand of the user combs a subject animal with a flea comb. During combing, fleas are dislodged and brought to the surface of the hair coat of the subject animal. When fleas appear on the surface of the coat, the user moves the nozzle of the ectoparasite diagnostic apparatus to the surface of the hair coat and activates the vacuum motor by pulling the trigger, thereby suctioning fleas through the nozzle and into the containment chamber. The user then closes the non-flexible pivoting door via the knob, thereby concealing fleas in the containment chamber. When one or more fleas are concealed, the user detaches the containment chamber from the vacuum assembly and the nozzle. Subsequently, the user may selectively insert a small fibrous pad pre-treated with a veterinary flea control chemical, and observe if the fleas succumb to the chemical.

The preferred embodiment is utilized by a user combing a subject animal with a flea comb. During combing, fleas are dislodged and brought to the surface of the hair coat of the subject animal. When fleas appear on the surface of the coat, the user inserts the flea comb into the receiving aperture. The vacuum switch activates the vacuum motor, thereby suctioning fleas caught in the flea comb into the containment chamber against the mesh screen. The user then closes the non-flexible pivoting door via the knob, thereby concealing fleas in the containment chamber. When one or more fleas are concealed, the user selectively inserts a small fibrous pad pre-treated with a flea control chemical into the containment chamber. The microscope observes if the fleas succumb to the chemical and shows flea interaction with the flea control chemical on the display. The display rotates on a hinge, thereby allowing a user to perpendicularly rotate the display away from the ectoparasite diagnostic apparatus.

Additionally, preferred embodiment is utilized by a user by placing a tube with a nozzle into the receiving aperture. The nozzle is then placed on a subject animal. The vacuum switch activates the vacuum motor, thereby suctioning fleas through the nozzle and into the containment chamber against the mesh screen, thereby entrapping fleas in the containment chamber. When one or more fleas are within the chamber, the user opens the non-flexible pivoting door via the knob, and selectively inserts a small fibrous pad pre-treated with a flea control chemical into the containment chamber. The microscope observes if the fleas succumb to the chemical and shows flea interaction with the flea control chemical on the display.

Accordingly, a feature and advantage of the present invention is its ability to capture fleas from infested dogs or cats for testing resistance to chemicals intended to eradicate such pests.

Another feature and advantage of the present invention is its ability to assist veterinary clinics prescribe effective flea control products.

Yet another feature and advantage of the present invention is its ability to capture other types of small parasites that infest humans, such as lice and bed bugs.

Yet still another feature and advantage of the present invention is its ability to allow a user to observe if fleas die from the effects of a selected chemical.

A further feature and advantage of the present invention is its ability to prevent a subject animal from being exposed to prolonged periods of vacuum motor noise that can upset the pet and make flea combing difficult.

Yet still a further feature and advantage of the present invention is its ability to allow and observer to easily see a large image of a live flea, thereby to understand flea behavior.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1-7, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
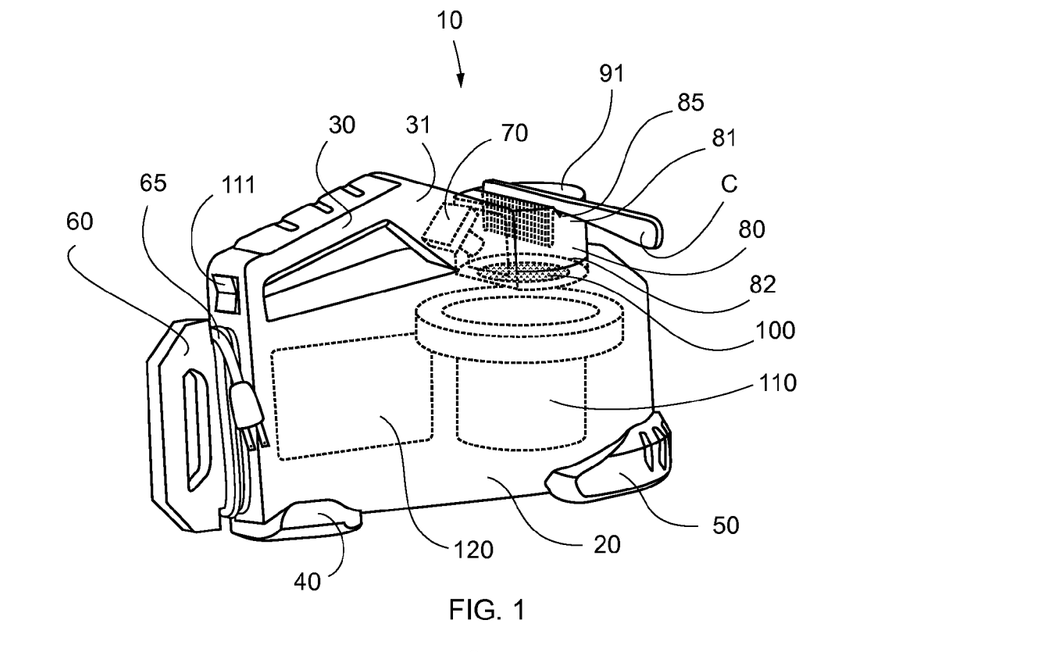
FIG. 1 is a perspective side view of an ectoparasite diagnostic apparatus according to a preferred embodiment, shown utilizing a flea comb.
Figure 2:
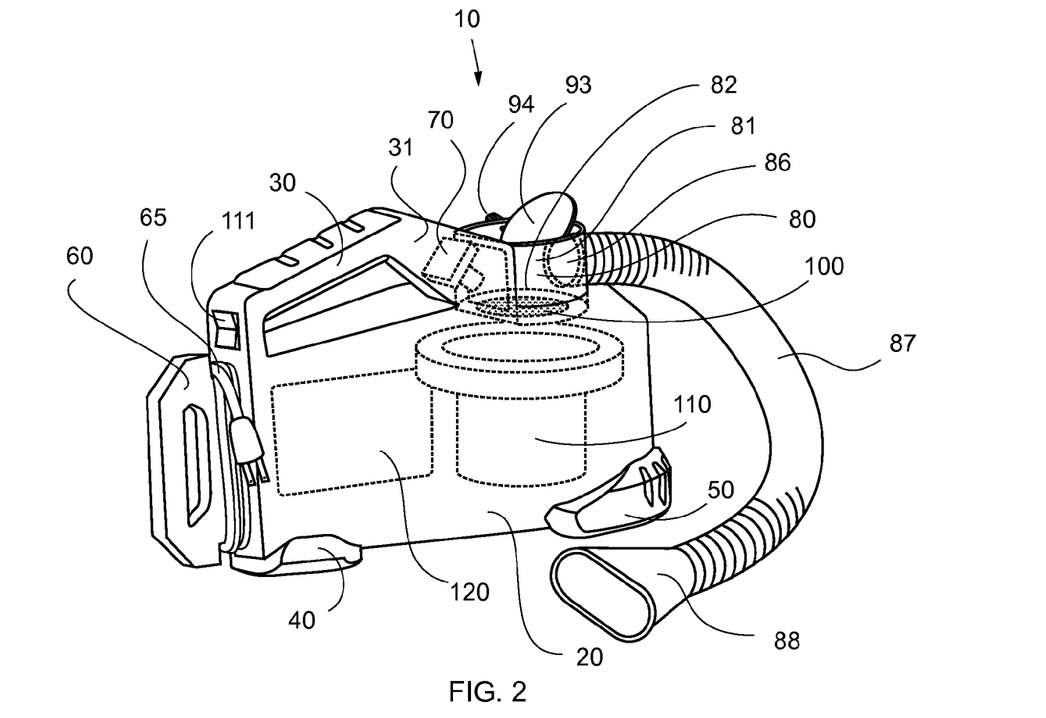
FIG. 2 is a perspective side view of an ectoparasite diagnostic apparatus according to a preferred embodiment, shown utilizing a vacuum hose.

Referring now to FIGS. 1-2, ectoparasite diagnostic apparatus 10 comprises housing 20, vacuum switch 111 and containment chamber 80, wherein housing 20 comprises handle 30, back foot 40, front foot 50, secondary handle 60 and power cord 65. Housing 20 further comprises microscope 70, mesh screen 100, vacuum motor 110 and display 120, wherein microscope 70 is in electrical communication with display 120. Handle 30 comprises end 31, wherein microscope 70 is disposed within end 31, and wherein microscope 70 is positioned to view fleas within containment chamber 80. Handle 30 allows a user to grip ectoparasite diagnostic apparatus 10 as a hand-held apparatus and power cord 65 supplies ectoparasite diagnostic apparatus 10 with power. When ectoparasite diagnostic apparatus 10 is not in use, power cord 65 is selectively wrapped around secondary handle 60 and ectoparasite diagnostic apparatus 10, wherein ectoparasite diagnostic apparatus 10 is supported on a surface via back foot 40 and front foot 50.

Figure 7:
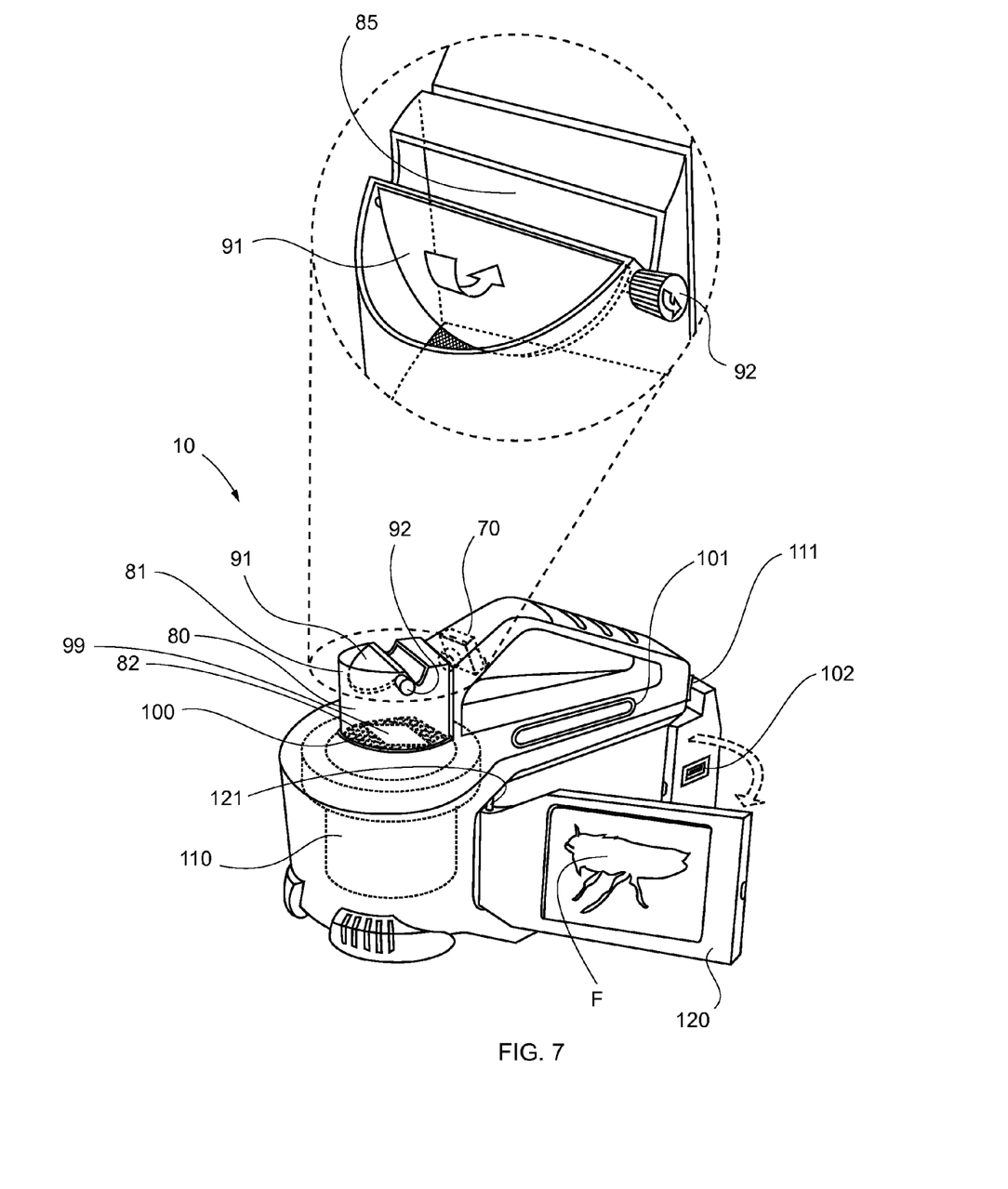
FIG. 7 is a perspective view of an ectoparasite diagnostic apparatus according to a preferred embodiment, shown with detail perspective view of a containment chamber having a non-flexible pivoting door.

Referring specifically to FIGS. 1 and 7, a preferred embodiment further comprises containment chamber 80, wherein containment chamber 80 comprises (as best shown in FIG. 7) top 81, bottom 82, non-flexible pivoting half door 91 and knob 92, wherein non-flexible pivoting half door 91 is disposed proximate top 81 of containment chamber 80, and wherein mesh screen 100 is disposed proximate bottom 82 of containment chamber 80. Non-flexible pivoting half door 91 rotates open and closed via knob 92. Containment chamber 80 further comprises receiving aperture 85, wherein receiving aperture 85 is dimensioned to receive flea comb C (best shown in FIG. 1), and wherein flea comb C is utilized to comb a subject animal to dislodge fleas F and is subsequently inserted into receiving aperture 85. Fleas F are then suctioned into containment chamber 80 via vacuum motor 110 by activating vacuum switch 111, thereby pulling fleas F into containment chamber 80 against mesh screen 100, while still allowing air and other debris to filter past mesh screen 100. It will be recognized by those skilled in the art that containment chamber 80 and non-flexible pivoting half door 91 may comprise, for exemplary purposes only, a translucent material, such as rigid plastic or glass, thereby allowing an operator to visually determine if fleas F have been suctioned into containment chamber 80, and if non-flexible pivoting half door 91 should be closed to confine fleas F within containment chamber 80. It will also be recognize by those skilled in the art that receiving aperture 85 may also be dimensioned to receive a microscope slide receptacle as an alternative to flea comb C.

Referring now to FIG. 2, another preferred embodiment comprises containment chamber 80, wherein containment chamber 80 comprises top 81, bottom 82, non-flexible pivoting full door 93 and knob 94. Non-flexible pivoting full door 93 is disposed proximate top 81 of containment chamber 80, and mesh screen 100 is disposed proximate bottom 82 of containment chamber 80, wherein non-flexible pivoting full door 93 pivots open and close via knob 94. When vacuum motor 110 is activated via vacuum switch 111, vacuum motor 110 pulls fleas F (as best shown in FIG. 7) into containment chamber 80 against mesh screen 100. Containment chamber 80 further selectively comprises receiving aperture 86, wherein receiving aperture 86 is dimensioned to receive tube 87, and wherein tube 87 comprises nozzle 88. Nozzle 88 contacts subject animal for removal of fleas F, wherein fleas F are subsequently suctioned into containment chamber 80 via vacuum motor 110, thereby pulling fleas F against mesh screen 100. It will be recognized by those skilled in the art that containment chamber 80 and non-flexible pivoting full door 93 may comprise, for exemplary purposes only, a translucent material, such as rigid plastic or glass, thereby allowing an operator to visually determine if fleas F have been suctioned into containment chamber 80, so that non-flexible pivoting full door 93 may be closed to confine fleas F within containment chamber 80.

Figure 3:
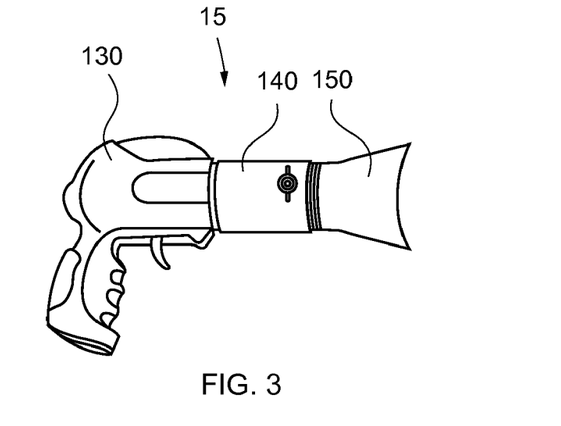
FIG. 3 is a perspective side view of an ectoparasite diagnostic apparatus according an alternate embodiment.
Figure 4:
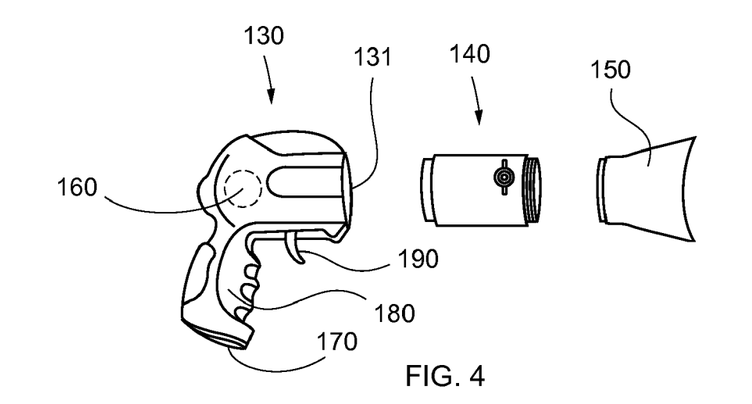
FIG. 4 is an exploded perspective view of an ectoparasite diagnostic apparatus according an alternate embodiment.
Figure 5:
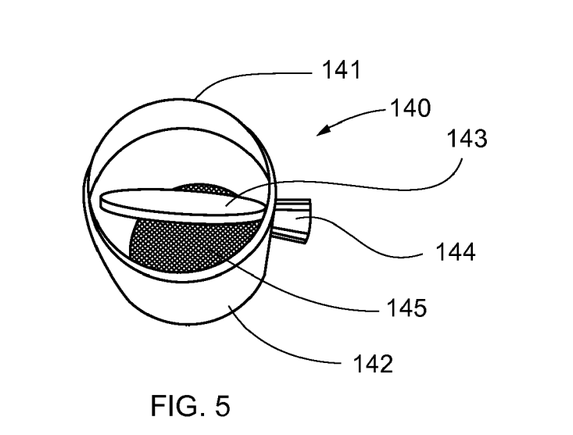
FIG. 5 is top perspective view of a capture chamber and a mesh screen according to an alternate embodiment.

Referring now to FIGS. 3-5, illustrated therein is an alternate embodiment of ectoparasite diagnostic apparatus 10, wherein the alternate embodiment of FIGS. 3-5 is substantially equivalent in form and function to that of the preferred embodiments detailed and illustrated in FIGS. 1-2 except as hereinafter specifically referenced. Specifically, the embodiment of FIGS. 3-5 comprises ectoparasite diagnostic apparatus 15 having vacuum assembly 130, containment chamber 140 and nozzle 150, wherein vacuum assembly 130 comprises opening 131, vacuum motor 160, rechargeable battery door 170, gripping handle 180 and trigger 190. Vacuum motor 160 is activated by pulling trigger 190, wherein trigger 190 activates electric power from a battery to vacuum motor 160, thereby creating suction at nozzle 150. It will be recognized by those skilled in the art that other power sources than batteries could be utilized without departing from the spirit of this alternate embodiment.

When trigger 190 is released, vacuum motor 160 returns to an off position. Opening 131 of vacuum assembly 130 is dimensioned to receive containment chamber 140, wherein containment chamber 140 comprises top 141, bottom 142, non-flexible pivoting door 143 and knob 144. Non-flexible pivoting door 143 is disposed proximate top 141 of containment chamber 140, wherein mesh screen 145 is disposed proximate bottom 142 of containment chamber 140. Top 141 of containment chamber 140 is dimensioned to receive nozzle 150, wherein nozzle 150, as discussed hereinbelow, contacts the surface of a hair coat of a subject animal.

Figure 6:
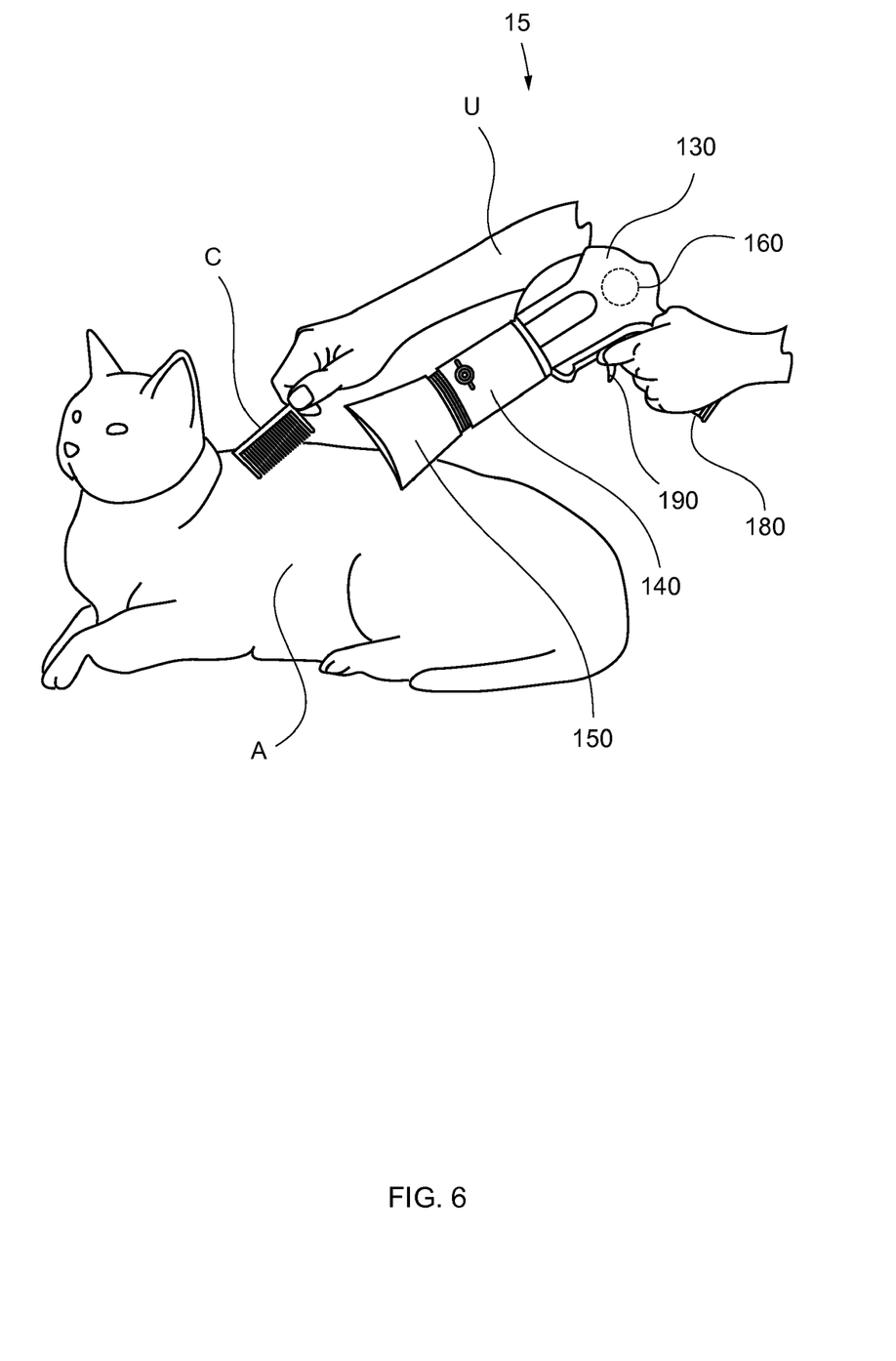
FIG. 6 is a perspective side view of an ectoparasite diagnostic apparatus according to an alternate embodiment, shown in use.

Referring now to FIG. 6, the alternate embodiment of ectoparasite diagnostic apparatus 15 is utilized by user U grasping gripping handle 180 of ectoparasite diagnostic apparatus 15, wherein the index finger of user U is positioned on trigger 190. The other hand of user U combs subject animal A with flea comb C. During combing, fleas are dislodged and brought to the surface of the hair coat of subject animal A. When fleas appear on the surface of the coat, user U opens non-flexible pivoting door 143 via knob 144 (best shown in FIG. 5) and moves nozzle 150 of ectoparasite diagnostic apparatus 15 to the surface of the hair coat. User U then activates vacuum motor 160 by pulling trigger 190, thereby suctioning fleas through nozzle 150 and into containment chamber 140. User U subsequently closes non-flexible pivoting door 143 via knob 144, thereby entrapping fleas in containment chamber 140. When one or more fleas are entrapped, user U selectively detaches containment chamber 140 from vacuum assembly 130 and nozzle 150 and selectively inserts a small fibrous pad 99 (as shown in FIG. 7) pre-treated with a veterinary flea control chemical, and observe if the fleas F succumb to the chemical.

Referring now to FIG. 7, a preferred embodiment of ectoparasite diagnostic apparatus 10 is utilized by combing a subject animal via flea comb C (best shown in FIG. 1). During combing, fleas F are dislodged and brought to the surface of the hair coat of the subject animal. When fleas F appear on the surface of the coat, flea comb C is inserted into receiving aperture 85, wherein vacuum switch 111 activates vacuum motor 110, thereby suctioning fleas F caught in flea comb C into containment chamber 80 against mesh screen 100. When one or more fleas F are concealed in containment chamber 80, non-flexible pivoting half door 91 is opened via knob 92, wherein a small fibrous pad 99 pre-treated with a veterinary flea control chemical is inserted into containment chamber 80. Non-flexible pivoting half door 91 is then closed via knob 92, wherein microscope 70 observes if fleas F succumb to the chemical and shows flea F interaction with the flea control chemical on display 120. Display 120 rotates about hinge 121, thereby allowing display to rotate display 120 away from ectoparasite diagnostic apparatus 10 and allow a user to more easily view the interaction of the flea control chemical on fleas F. It will be recognized by those skilled in the art that the preferred embodiment may utilize tube 87 comprising nozzle 88, as best shown in FIG. 2, to remove fleas F from the subject animal, wherein tube 87 is inserted into receiving aperture 86.

It will also be recognized by those skilled in the art that ectoparasite diagnostic apparatus 10 may comprise a florescent light source 101 adjacent to microscope 70 in order to illuminate flea eggs or flea feces on display 120. Additionally, ectoparasite diagnostic apparatus 10 could comprise digital microscope 70 and display 120 external and connected via a cable (such as to USB port 102 as is known in the art) to show an image of pet skin areas suspected of having mite infections, fungal infections, and the like. Additionally, ectoparasite diagnostic apparatus 10 may comprise USB port 102 and circuitry for printing images that are observed on display 120.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A method of capturing live ectoparasites for observation, said method comprising the steps of:
   obtaining an apparatus comprising a digital microscope with display, and a containment chamber disposed at a distal end of a vacuum tube from the nozzle end thereof, wherein said containment chamber comprises a non-flexible pivoting door;
   removing live ectoparasites from a subject animal;
   disposing a flea comb in a receiving aperture in said containment chamber, wherein the flea comb is disposed within the field of observation of said digital microscope;
   disposing the live ectoparasites in said containment chamber;
   closing said non-flexible pivoting door; and observing the live ectoparasites in said containment chamber via said digital microscope with display.

2. The method of claim 1, further comprising the step of:
optionally vacuuming live ectoparasites from the subject animal into said containment chamber.

3. The method of claim 1, further comprising the steps of:
optionally utilizing a flea comb to remove live ectoparasites from the subject animal.

4. The method of claim 1, further comprising the steps of:
treating live ectoparasites with a flea control compound; and observing the effect of the flea control compound on the live ectoparasites.

* * * * *